L. F. ADT.
NOSE GUARD FOR EYEGLASSES.
APPLICATION FILED MAR. 24, 1906.
1,038,711.  Patented Sept. 17, 1912.
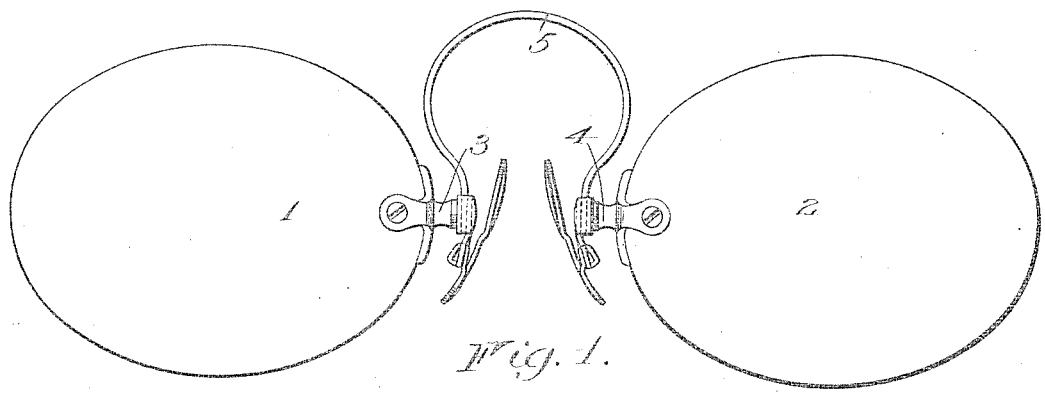
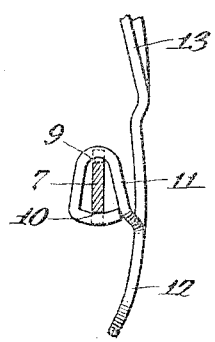
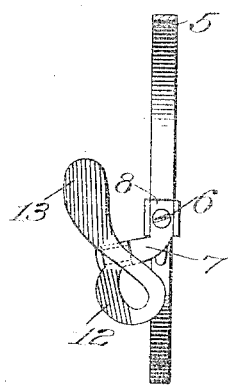
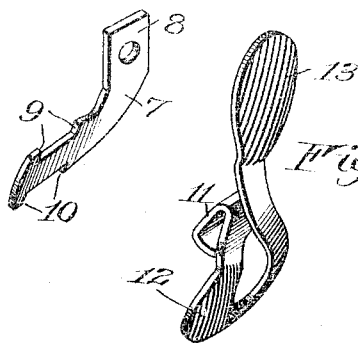
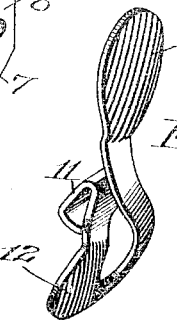
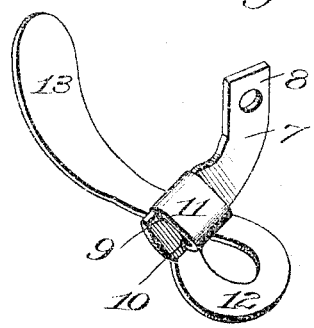

UNITED STATES PATENT OFFICE.

LEO F. ADT, OF ALBANY, NEW YORK.

NOSE-GUARD FOR EYEGLASSES.

1,038,711.

Specification of Letters Patent.

Patented Sept. 17, 1912.

Application filed March 24, 1906. Serial No. 307,774.

*To all whom it may concern:*

Be it known that I, LEO F. ADT, of Albany, in the county of Albany and State of New York, have invented certain new and useful Improvements in Nose-Guards for Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses, and its object is to provide improved nose guards that are self-adjusting in order that they will accommodate themselves to the relative angular arrangement, as well as to the irregularities in the surfaces of different noses so that a firm and even hold of the guards is obtained in each case, without requiring a special adjustment of the guards by the optician for each individual.

To these and other ends the invention consists in certain improvements and combinations of parts, all as will be hereinafter more fully explained, the novel features being pointed out in the claims at the end of the specification.

In the drawing: Figure 1 is a front elevation of a pair of eyeglasses equipped with nose-guards constructed in accordance with my present invention. Fig. 2 represents a transverse section through the bridge looking toward the right, showing the inner side of the guard. Fig. 3 is a perspective view of the guard detached from the mounting, and Figs. 4 and 5 are perspective views respectively of the guard-attaching arm and the nose-engaging member separated. Fig. 6 is a detail section of the guard taken through the supporting arm thereof in a plane substantially parallel to the plane of the rocking movement.

Similar reference numerals in the several figures indicate similar parts.

In fitting eyeglasses to the noses of different persons, the characteristics of the noses vary to such an extent that in employing the ordinary form of nose guard, it is necessary for the optician to bend or otherwise adjust the guards so that they will rest in proper relation to obtain the requisite hold to support the eyeglasses, and this operation is objectionable inasmuch as the adjustment of the guards is only approximate, and is not permanent by reason of the re- siliency of the parts, the operation also involving both time and expense. Nose guards constructed in accordance with my present invention avoid the necessity of this preliminary adjusting or fitting, and the present embodiment of my invention is shown in connection with the ordinary form of eyeglasses employing preferably a spring bridge for holding the guards in coöperative relation with the nose, 1 and 2 designating the lenses provided with suitable attaching devices 3 and 4 which are connected by the spring bridge 5, the ordinary form of attaching studs being shown in the present instance having a fastening screw 6 for securing together the parts of the mounting. The nose guards are preferably attached in the ordinary way to these attaching studs, each guard embodying an attaching arm 7 having in the present instance a vertically-extending attaching lug 8 which enters the stud from beneath and is secured by the fastening screw 6. This attaching arm preferably extends rearwardly from its point of attachment, and has recesses cut in its upper and lower edges to form the oppositely-arranged paired shoulders 9 and 10, respectively. The nose-engaging member of the guard has a bearing portion extending around the attaching arm and is of such width as to fit snugly between the shoulders 9 and 10 thereon so that relative forward and rearward motion of the guard is limited or prevented by these shoulders, while the opposite sides of the bearing are inclined so as to widen the lower portion of the bearing and thus permit a rocking movement of the guard about the attaching arm as a fulcrum, the amount of the rocking movement being limited by the oppositely-inclined sides of the bearing.

In order to obtain the best holding qualities with the guards, without undue pressure at any particular point on the irregular surfaces of the nose, it is best to employ a nose-engaging portion that is sufficiently resilient to enable it to conform substantially to the surface with which it engages, and such a guard is shown in the present instance, it being composed of flat resilient material having the fulcrum bearing 11 formed on one end thereof and the metal proceeding from this bearing in a direction first downwardly and being slightly widened to form the lower nose-bearing surface 12, and being thence doubled upwardly and preferably rearwardly to form an upper or supplemental nose-bearing surface 13, the fulcrum point or bearing where the pressure is applied to the guard being located intermediately of the two nose-bearing surfaces, and the nose-bearing surfaces themselves being connected by resilient material of such length as to afford such elasticity to the guard as will enable it to equalize the pressure throughout the surfaces engaging the nose.

In order that the guards may accommodate themselves to the forward taper of the nose, it is preferable to slightly widen the upper portion of the bearing 11 of the guard in order to give it sufficient play transversely of the edge of the guard-attaching arm, and the rocking movement thus provided, together with the rocking movement of the guard substantially in a vertical plane, will permit the guard to automatically arrange itself according to the angular relation of the surfaces at the sides of the nose, the fulcrum point of the nose-engaging portion of the guard being arranged at a central point considered both vertically and horizontally of the guard, and as the pressure is applied to the guards at this fulcrum point from a suitable source, such for instance as by the action of the spring bridge, the resiliency of the nose-engaging member will automatically equalize the pressure applied to the different nose-engaging surfaces, notwithstanding variations in the angular shapes of different noses, so that not only is the usual fitting by the optician rendered unnecessary, but the self-adjusting guards insure a firm but even pressure at all points where they engage the nose, and the necessary hold is thus obtained without undue pinching of the flesh.

I claim as my invention:

1. In a nose guard, the combination with a substantially horizontally arranged arm, of a nose engaging member composed of a resilient piece of material having one end pivotally connected to the arm, then extended downwardly and upwardly to form a loop and carried upwardly above the arm and free of the latter, and an upper nose engaging pad at the free end of said resilient portion.

2. In eyeglasses, the combination with the lenses, and a bridge connecting them, of nose guards each embodying a nose-engaging portion having bearing surfaces thereon connected by a resilient loop to enable the nose-engaging portions to conform to the surface of the nose, and an attaching portion connected to the mounting and having the nose-engaging portion fulcrumed thereon at a point intermediate of the bearing surfaces thereof to permit a free relative rocking movement between the nose-engaging portion and the attaching portion, the bearing surfaces and the fulcrum point being arranged substantially in alinement.

3. In eyeglasses, the combination with the lenses, and a bridge connecting them, of nose guards each embodying an attaching portion connected to the mounting, and a nose-engaging member composed of resilient material having one end journaled to turn on the attaching arm, a nose-bearing surface being formed on the member at one side of its point of attachment, and the other end of the material being doubled and extended beyond the point of attachment and forming an additional or supplemental nose-bearing surface.

4. In eyeglasses, the combination with the lenses, and a bridge connecting them, of nose guards each embodying an attaching portion connected to the mounting having a flat portion thereon and a nose-engaging member having a bearing portion coöperating with the flat portion on the attaching portion to permit a relative rocking movement of the nose-engaging member, the sides of said bearing portion being relatively inclined to limit the rocking movement of said member.

5. In eyeglasses, the combination with the lenses, and a bridge connecting them, of nose guards each embodying a rearwardly-extending attaching arm connected to the mounting and having recesses formed in its upper and lower edges to form limiting shoulders, and a nose-engaging member having a portion loosely embracing the attaching arm and resting in said recesses between the limiting shoulders to form a bearing permitting relative rocking movement of the nose-engaging member about the attaching arm as a center, said shoulders preventing movement of said member substantially in the plane of said arm.

6. In eyeglasses, the combination with the lenses, and a bridge connecting them, of nose guards each embodying an attaching arm secured to a part of the mounting, and a nose-engaging member composed of resilient material having a downwardly-looped portion formed with a lower nose-engaging surface thereon, one end of the loop being provided with a rocking connection with the guard-attaching arm, the other end of the loop being extended upwardly beyond the point of connection and provided with an additional nose-engaging surface.

7. In eyeglasses, the combination with the lenses, and a bridge connecting them, of nose guards each embodying an attaching arm secured to a part of the mounting, and a nose-engaging member composed of flat resilient material having a loop formed by an edgewise bend in the material, one end of the loop being provided with a bearing coöperating with the guard-attaching arm to permit a rocking movement of the nose-engaging member, the other end of the loop being extended upwardly beyond the bearing and provided with a nose-engaging pad or surface.

8. A guard for eyeglasses comprising a relatively fixed supporting arm and a rocking nose engaging member provided, respectively, with coöperating bearing portions comprising a bearing eye on one and a part on the other extending into said eye, one of said bearing portions being substantially flat and the other triangular in cross section to allow the rocking movement of the nose engaging member and also limit that movement.

9. A guard for eyeglasses comprising a relatively fixed supporting arm composed of flat material and a rocking nose engaging member also composed of flat material, said member being provided respectively with coöperating bearing portions comprising a bearing eye on one formed by doubling over the material flatwise and a part on the other having a section reduced widthwise to lie within the eye and providing shoulders at opposite ends of the latter preventing relative movement axially of the rocking movement.

LEO F. ADT.

Witnesses:
F. F. Church,
G. Willard Rich.